United States Patent
Jae et al.

(10) Patent No.: US 12,327,204 B2
(45) Date of Patent: Jun. 10, 2025

(54) POPULATION AND CONTAMINATION ESTIMATION METHOD FOR SEVERE ACCIDENTS IN NUCLEAR POWER PLANTS

(71) Applicant: IUCF-HYU (INDUSTRY-UNIVERSITY COOPERATION FOUNDATION HANYANG UNIVERSITY), Seoul (KR)

(72) Inventors: Moosung Jae, Seoul (KR); Byeongmun An, Seoul (KR); Ye In Seo, Namyangju-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 629 days.

(21) Appl. No.: 17/293,620

(22) PCT Filed: Nov. 5, 2019

(86) PCT No.: PCT/KR2019/014876
§ 371 (c)(1),
(2) Date: May 13, 2021

(87) PCT Pub. No.: WO2020/101241
PCT Pub. Date: May 22, 2020

(65) Prior Publication Data
US 2022/0013245 A1 Jan. 13, 2022

(30) Foreign Application Priority Data
Nov. 15, 2018 (KR) .................. 10-2018-0140491

(51) Int. Cl.
G06Q 10/04 (2023.01)
G06Q 50/26 (2012.01)

(52) U.S. Cl.
CPC ............. *G06Q 10/04* (2013.01); *G06Q 50/26* (2013.01)

(58) Field of Classification Search
CPC ..................................................... G06Q 10/04
(Continued)

(56) References Cited

U.S. PATENT DOCUMENTS

| 2011/0276269 A1* | 11/2011 | Hummel | G01W 1/10 |
| | | | 702/3 |
| 2014/0149038 A1* | 5/2014 | Cronin | G01W 1/10 |
| | | | 702/3 |

(Continued)

FOREIGN PATENT DOCUMENTS

| KR | 10-2012-0077249 A | 7/2012 |
| KR | 10-1329395 B1 | 11/2013 |

(Continued)

OTHER PUBLICATIONS

Byeongmun Ahn, et al., "Development of the MSPAR-SITE Code for Estimating Multi-Unit MACCS Site", Korean Nuclear Society, KNS 2018 Spring Conference, May 18, 2018, pp. 1-3.

(Continued)

*Primary Examiner* — Nga B Nguyen
(74) *Attorney, Agent, or Firm* — Sughrue Mion, PLLC

(57) ABSTRACT

Disclosed is a population and contamination estimation method for severe accidents in nuclear power plants. The population estimation method performed by a population estimation device according to an embodiment may include storing location information of a nuclear power plant on a map and predicting a multi-unit accident occurrence point (Continued)

based on information on a plurality of single units associated with the nuclear power plant stored on the map.

8 Claims, 6 Drawing Sheets

(58) Field of Classification Search
USPC .......................................................... 705/7.11
See application file for complete search history.

(56) References Cited

U.S. PATENT DOCUMENTS

| | | | |
|---|---|---|---|
| 2015/0177415 A1* | 6/2015 | Bing | G01W 1/10 |
| | | | 702/3 |
| 2015/0244591 A1* | 8/2015 | Brown | H04L 12/12 |
| | | | 709/223 |

FOREIGN PATENT DOCUMENTS

| | | |
|---|---|---|
| KR | 10-2015-0080041 A | 7/2015 |
| KR | 10-1670305 B1 | 10/2016 |

OTHER PUBLICATIONS

Yein Seo, et al., "A Consideration of the Single Release Location for the Multi-Unit Accidents", Probabilistic Safety Assessment and Management PSAM 14, Sep. 2018, pp. 1-8.

International Search Report for PCT/KR2019/014876 dated Feb. 13, 2020 (PCT/ISA/210).

* cited by examiner

POPULATION AND CONTAMINATION ESTIMATION METHOD FOR SEVERE ACCIDENTS IN NUCLEAR POWER PLANTS

CROSS REFERENCE TO RELATED APPLICATIONS

This application is a National Stage of International Application No. PCT/KR2019/014876 filed Nov. 5, 2019, claiming priority based on Korean Patent Application No. 10-2018-0140491 filed Nov. 15, 2018.

TECHNICAL FIELD

The following description relates to a population and contamination estimation technology during severe accidents in nuclear power plants. The disclosure is supported by the National Research and Development Project as follows: Project Number: 17050010218SB110, Related Department: Nuclear Safety And Security Commission, Research Management Specialized Agency: Korea Foundation of Nuclear Safety, Research Business Name: Nuclear Safety Research Business/Nuclear Safety Research And Development Business/Nuclear Safety Regulation Technology Development Business, Research Project Title: Multi-unit Probabilistic Safety Assessment (PSA) Regulatory Verification Technology Development, Contribution Ratio: 1/1, Managing Department: Industry-Academic Cooperation Foundation of Hanyang University, and Research Period: Jan. 1, 2018 to Dec. 31, 2018.

BACKGROUND ART

Computer code for probabilistic safety evaluation, which is one of the fields of nuclear safety analysis, requires a polar coordinate radiation grid centered on an accident occurrence point and the population data and land fraction of each sector divided along the grid. In order to estimate the population of the sector, a method is used in which an administrative region is directly cut out along the boundary of the sector and the population of the cut-out administrative region is directly calculated and added to the population of the sector by an operator. Even in the case of the land fraction, a method is used in which a user directly calculates an area ratio of land and sea with the naked eye.

In the existing method, a person needs to directly calculate the population and the land fraction in the sector, and the process thereof is cumbersome. Therefore, a lot of manpower is required and there is room for calculation errors, and when the sector becomes larger or is increased, the number of the administrative regions to be calculated is also increased, such that work fatigue is high.

DISCLOSURE

Technical Problem

The disclosure provides a method and device for modeling a polar coordinate radiation grid composed of a plurality of sectors required for performing safety evaluation of nuclear power plants, and estimating the population of each sector using geographic information system (GIS) data including information about the population and areas such as administrative regions.

Technical Solution

A population estimation method performed by a population estimation device include storing location information of a nuclear power plant on a map and predicting a multi-unit accident occurrence point based on information on a plurality of single units associated with the nuclear power plant stored on the map.

The predicting of the multi-unit accident occurrence point may include calculating an area of each administrative region using administrative region data based on GIS data; and modeling a radiation grid of a polar coordinate system composed of a plurality of sectors for performing safety evaluation of the nuclear power plant, and a grid of the polar coordinate system may be modeled to generate a set of sectors having coordinate values of the polar coordinate system based on setting information including a center point, an orientation, and an interval of the grid.

The predicting of the multi-unit accident occurrence point may include calculating sector data using a divide-and-conquer method based on the calculated area of each administrative region and an overlapping administrative region through the sector modeled in the modeled radiation grid of the polar coordinate system, and the sector data may refer to a population and a land fraction of the sector, an administrative region included in the sector and a population and an area occupied by the administrative region in the sector.

The predicting of the multi-unit accident occurrence point may include inputting an economic factor to an administrative region included in the sector as the sector data is calculated; and calculating a representative administrative region for each sector using the input economic factor.

The predicting of the multi-unit accident occurrence point may include predicting a multi-unit accident occurrence point based on a weight value of the plurality of single units present in the nuclear power plant.

The predicting of the multi-unit accident occurrence point may include visually displaying a concentration and a radiation dose for each atmospheric nuclide on the map based on the sector data.

A computer program stored in a computer-readable storage medium for executing a population estimation method performed by a population estimating device include storing location information of a nuclear power plant on a map and predicting a multi-unit accident occurrence point based on information on a plurality of single units associated with the nuclear power plant stored on the map.

A population estimation device includes a storage unit that stores location information of a nuclear power plant on a map and a prediction unit that predicts a multi-unit accident occurrence point based on information on a plurality of single units associated with the nuclear power plant stored on the map.

The population estimation device may further include an interface unit that provides a user interface for population estimation to receive an input including the location information on the nuclear power plant and information on the plurality of single units associated with the nuclear power plant.

The prediction unit may calculate an area of each administrative region by using administrative region data based on GIS data, and model a radiation grid of a polar coordinate system composed of a plurality of sectors for performing safety evaluation of the nuclear power plant, and a grid of the polar coordinate system may be modeled to generate a set of sectors having coordinate values of polar coordinates based on setting information including a center point, an orientation, and an interval of the grid.

The prediction unit may calculate sector data using a divide-and-conquer method based on the calculated area of each administrative region and an overlapping administrative region through the sector modeled in the modeled polar coordinate radiation grid, and the sector data may refer to a population and a land fraction of the sector, an administrative region included in the sector and a population and an area occupied by the administrative region in the sector.

The prediction unit may receive an economic factor to an administrative region included in the sector as the sector data is calculated and may calculate a representative administrative region for each sector using the input economic factor.

The prediction unit may predict the multi-unit accident occurrence point based on a weight value for the plurality of single units present in the nuclear power plant.

The prediction unit may visually display a concentration and a radiation dose for each atmospheric nuclide on the map based on the sector data.

Advantageous Effects

Since the task of modeling the polar coordinate radiation grid and obtaining relevant data is computerized, the efficiency of the task for obtaining sectors and data of the sectors can be increased, and since the task is performed on a computer map, visual effects and accuracy are also high.

Since population calculation, which is a process for requiring the most manpower in population estimation, is computerized, population estimation can be performed with the minimum manpower even when the shape and data of the administrative region and the sector are changed, and data other than population such as land fraction and intra-sector administrative region information can be calculated by applying the system.

BEST MODE

Embodiments will now be described in detail with reference to the accompanying drawings.

Figure 1:
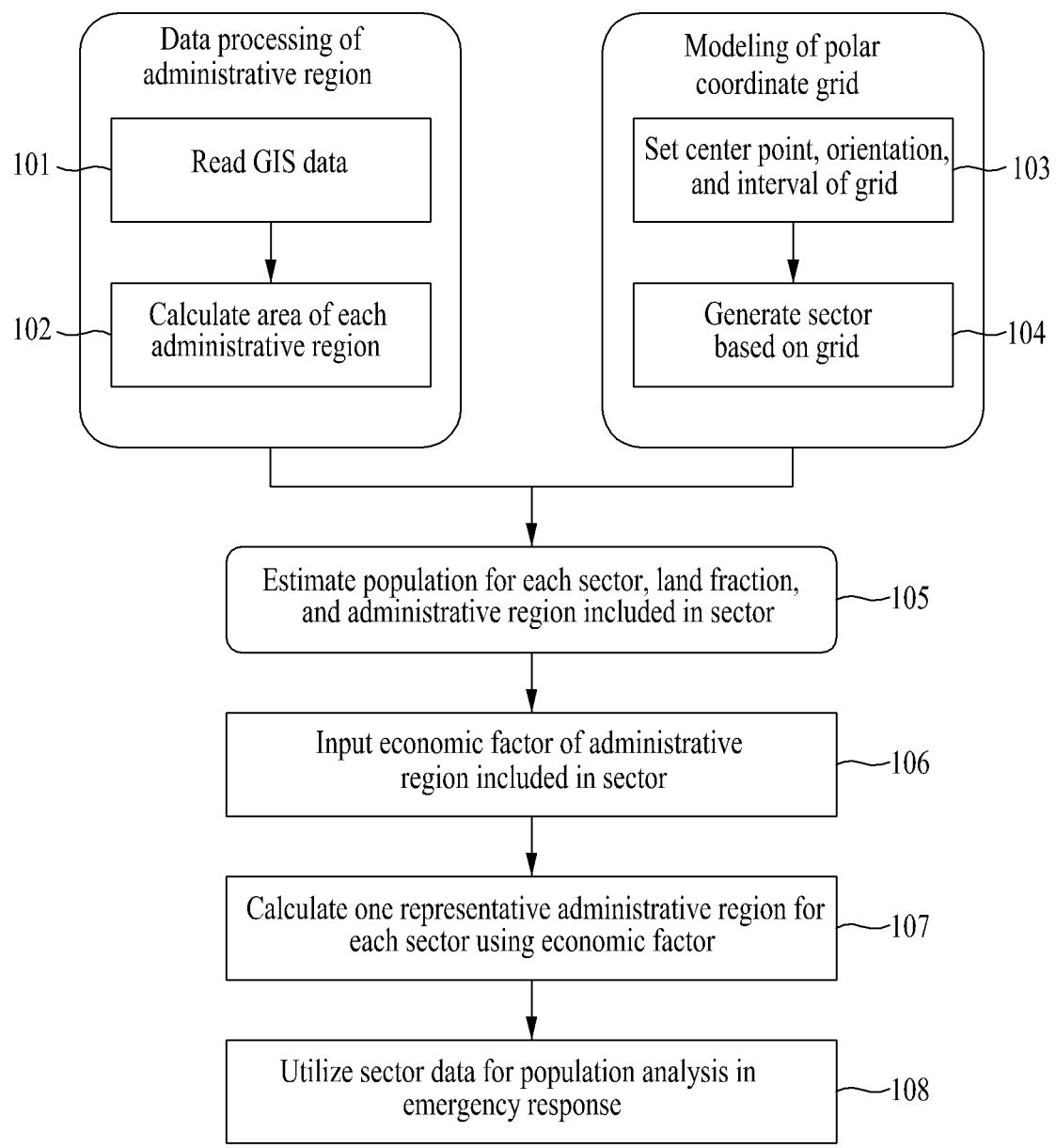
FIG. 1 is a flowchart for describing a population estimation method of a population estimation device according to an embodiment.

FIG. 1 is a flowchart for describing a population estimation method of a population estimation device according to an embodiment.

The population estimation device may provide a solution for modeling a polar coordinate radiation grid and calculating sector data related to the modeled polar coordinate radiation grid. The population estimation device may provide tools performed only using a sector in the polar coordinate system, such as a simulation program and a user interface, and a user may calculate the sector data by using the tools.

The population estimation device may collect information related to a plurality of accident occurrence points and estimate a new center point. For example, a new center point may be estimated by collecting characteristics of a nuclear power plant.

In order to calculate the population of the sector, administrative region data is first needed, and the original source of the administrative region data is referred to as geographic information system (GIS) data. Accordingly, the population estimation device may calculate an area of each administrative region using the administrative region data based on the GIS data. The population estimation device may read the GIS data (101) and generate an area of each administrative region (102). For example, the population estimation device may process the GIS data to generate the administrative region data used in the system. In this case, the area of each administrative region may be calculated using the following Equation 1.

$$\text{Area of Administrative Region} = \left| \left( \sum_{i}^{n-1} \text{rad}(p_{ing}[i+1] - p_{ing}[i]) \right) \right. $$
$$\left. (2 + \sin(\text{rad}(p_{lat}[i])) + \sin(\text{rad}(p_{lat}[i+1]))) \right. $$
$$\left. \frac{6378137^2}{2} \right| \ast \text{rad}(\theta°) = \theta°\pi/180 \quad \text{Equation 1}$$

Area of Administrative District

In Equation 1, p[i] represents an $i^{th}$ vertex of a polygon of the administrative region, and $p_{ing}$ [i] and $p_{lat}$ [i] represent a longitude and a latitude of the $i^{th}$ vertex, respectively. When using Equation 1, all vertices need to be arranged within the outline of the polygon regardless of the clockwise/counter-clockwise order. However, the polygon-type GIS data is not subjected to a separate processing procedure in the embodiment because the vertices are arranged basically. Since a value of the longitude is represented by a decimal angle method (degree) in a computer, it may be converted into a radian value through a rad (θ°) function to derive an area.

The population estimation device may model a grid on the polar coordinate system to generate a set of sectors having coordinate values of the coordinate system. The population estimation device may set a center point, an orientation, and an interval of a grid based on setting information including the center point, the orientation, and the interval of the grid input from a user (103), and generate a grid-based sector set according to the setting information (input value) (104). At least three items may be set in order to create a sector. For example, the sector may be created by setting a location of the nuclear power plant to be the center of the grid, a radial grid segment (intervals of a plurality of circles in the grid), and the number of orientations of the radiation grids (16 orientations, 32 orientations, etc.).

The population estimation device may calculate data of the sector based on the administrative region overlapping with the sector (105) once the administrative region data and the sector have been prepared. Specifically, the population estimation device may calculate the sector data using a divide-and-conquer method based on the calculated area of each administrative region and the overlapping administrative region through the modeled sector in the modeled polar coordinate radiation grid. The divide-and-conquer method is a method of dividing one large sector into small sectors having the same characteristics, and derives the result of the large sector (parent sector) by collecting the results obtained from the small sectors. In this case, the sector data may mean the population and land fraction of a sector, an administrative region included in the sector, and population and area occupied by the administrative region in the sector.

The population estimation device may input an economic factor of the administrative region included in the sector (106), and may calculate one representative administrative region per sector using the input economic factor (107). The population estimation device may collect the sector data included in the sector (e.g., data associated with an administrative region included in the sector) to generate a list of all administrative regions present in the sector and set a representative administrative region of each sector from the generated list of all administrative regions. For example, a region with the highest population fraction may be set as a representative administrative region, and a region having the highest area fraction may be set as a representative administrative region.

The population estimation device may acquire sector data required for an emergency response population analysis for nuclear safety analysis (108). The population estimation device may provide the user with the sector data required for the population analysis. The user may utilize the sector data for the population analysis. The population estimation device may generate or convert data calculated by different systems (different programs) into a data model in a format provided in the embodiment, and make the data stored in different formats compatible. A population estimation device may visualize the concentration and the radiation dose for each atmospheric halide among the results of sectors calculated by different systems (different programs). In this case, colors may be displayed on the map differently according to the concentration and the radiation dose for each atmospheric halide.

In addition, the population estimation device may store a point that is frequently used (mainly, a nuclear power plant that is an accident occurrence point) more than a predetermined criterion, and specify the frequently used point as a center point of the grid. The user may automatically store the frequently used point without specifying the center point of the grid one by one. The population estimation device may implement a user-friendly interface using the Google Map API with an engine displaying the map. For example, the population estimation device may set names and coordinates (latitude and longitude) through the user interface to register points (locations), and may specify the registered points as center points. In this case, a new point may be generated based on a plurality of point averages or center of gravity. The user may set the point by directly inputting coordinate values for the point of occurrence of an accident, and may set the point centered on the position of the marker displayed on the map. A list of points set from the user may be displayed.

In addition, in a nuclear safety analysis of a multi-unit accident, as a multi-unit accident occurrence point needs to be predicted, in the embodiment, it is possible to predict the multi-unit accident occurrence point based on information of a plurality of (e.g., two) or more single units. The center point may be predicted based on Equation 2 in the embodiment of various methods for predicting the accident occurrence point.

$$p_m = \frac{\sum_i^n p_i w_i}{W}, W = \sum^{n_i} w_i \quad \text{Equation 2}$$

In Equation 2, $p_m$ is a multi-unit accident occurrence point, which is a result value, $p_i$ is a nuclear power plant point used for calculation, and $w_i$ is a weight value of the nuclear power plant. Here, the weight value may be an output of the nuclear power plant, a discharge amount, etc. The selection criteria of this weighting value may be selected and applied by classifying elements that may be considered as weighting values. Here, simple or frequently-used values from the classified elements may be selected as weighting values. For example, a multi-unit accident occurrence point may be predicted based on a simple location average, an electric power weighted location average, a thermal power weighted locations average, a released inventory weighted locations averaged, or a power plant with a dense population. The population estimation device may select a plurality of points and generate a new point with a center of gravity according to a weight value of the selected point.

Figure 2:
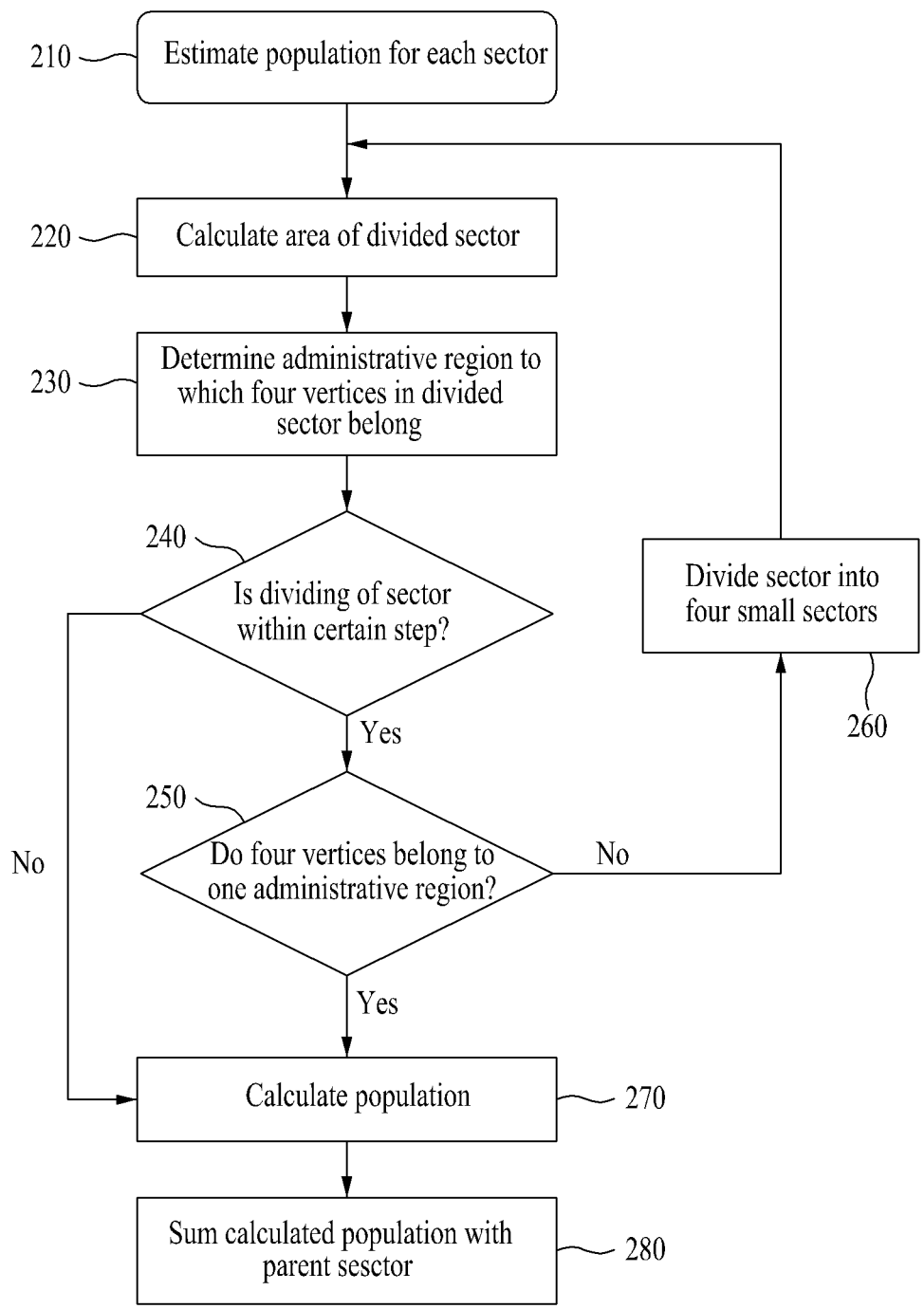
FIG. 2 is a flowchart for describing a method of calculating a population of sectors in a population estimation device according to an embodiment.

FIG. 2 is a flowchart for describing a method of calculating a population of sectors in a population estimation device according to an embodiment.

The population estimation device may execute a process for population estimation for each sector (210). The population estimation device may calculate an area of the divided sectors (220). The population estimation device may calculate the area of each administrative region using the administrative region information based on the GIS data. GIS may refer to a series of integrated systems that observe, collect, preserve, analyze, and output geospatial information and datarized by the computer. The GIS data generated by the GIS has information on spatial attributes and non-spatial attributes, and a plurality of features may be stored in one file. In this case, the feature may refer to an administrative region.

Figure 3:
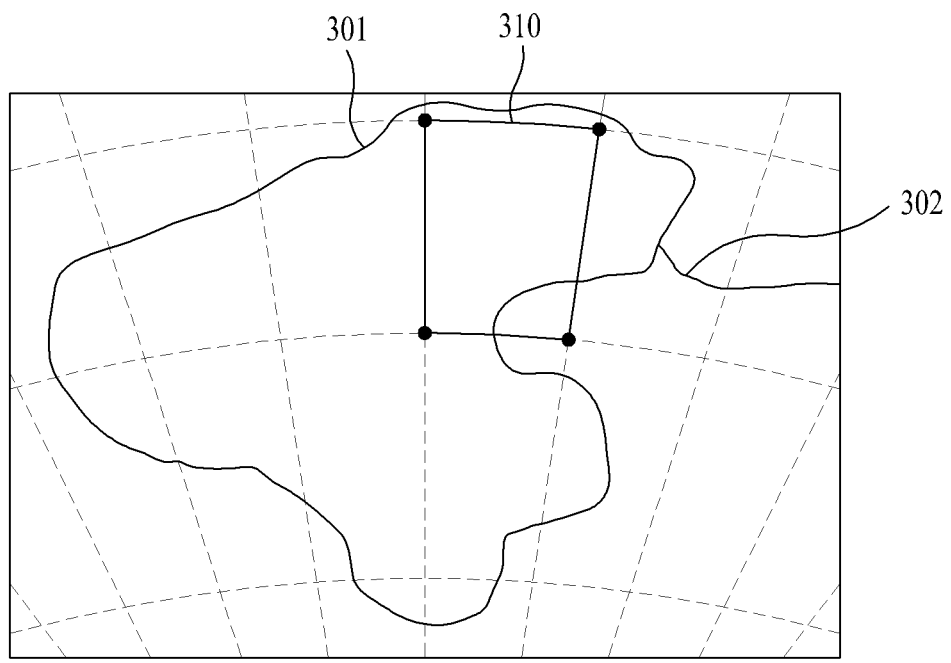
FIG. 3 is a diagram illustrating an initial sector in a population estimation device according to an embodiment.

Referring to FIG. 3, there may be an administrative region 301 and an administrative region 302, which represent initial sectors. Here, the grid may refer to the entire boundary line, and the fan-shaped sector divided based on the boundary line may refer to the sector. The sector in the grid may include information on a population and land fraction.

The population estimation device may determine which administrative region the four vertices belong to in a sector 310, which is one of the sectors of the polar coordinate radiation grid (230). For the sector 310, it may be determined that three vertices belong to the administrative region 301 and one vertex belongs to the administrative region 302. In this case, when any one of the four vertices of the sector 310 belongs to a different administrative region, the sector may perform a recursive search. Recursive search means a way of finding a vertex by dividing one sector into four child sectors (small sectors). As such, a sector may be divided into a plurality (e.g., four) of smaller sectors when it belongs to more than one administrative region. In the embodiment, when one sector is included in two or more administrative regions, the division into a plurality of (four) small sectors will be described by way of example.

Figure 4:
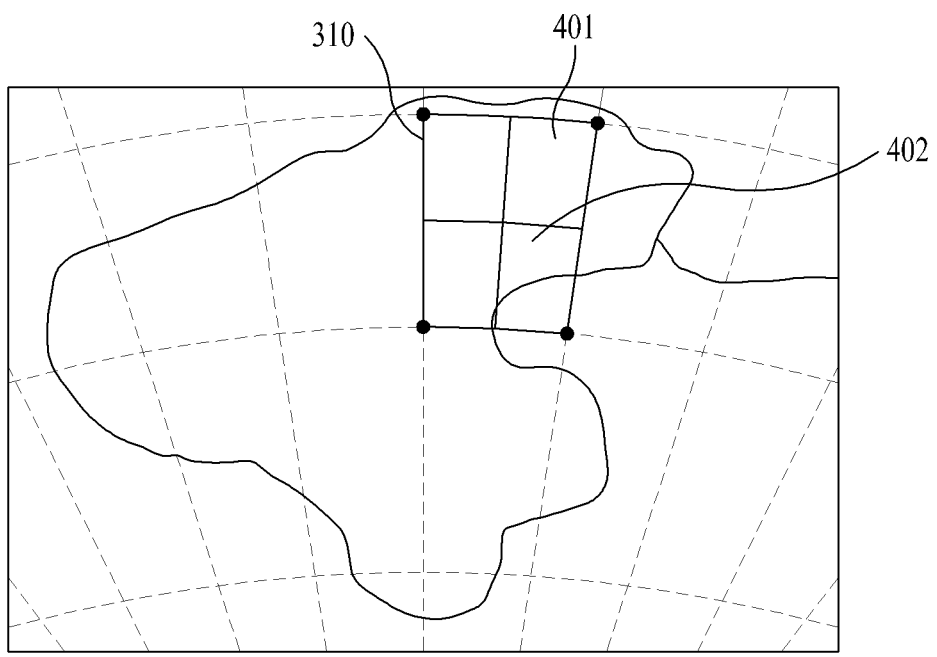
FIG. 4 is a diagram illustrating a divided sector in a population estimation device according to an embodiment.

The population estimation device may determine whether the dividing of the sector is within a certain step (240). Referring to FIG. 4, the sector 310 divided into four smaller sectors is illustrated. Each of the divided sectors may be searched for four vertices by applying the same method described above. When the four vertices belong to the same administrative region (250 and 270), such as a sector 401, population may be calculated by multiplying the area of the sector by a population density of the administrative region. In this case, both the area and the population density of the sector may be calculated. Conversely, when four vertices, belong to two or more administrative regions, such as a sector 402, calculation is performed with the same mechanism by dividing the sector into the four small sectors again (250 and 260).

Figure 5:
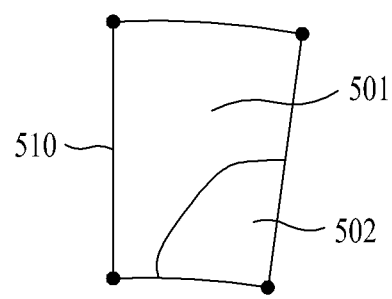
FIG. 5 is an example for describing a population calculation method of a sector in a population estimation device according to an embodiment.

Referring to FIG. 5, one sector 510 includes two administrative regions 501 and 502, but is already divided by more than a certain depth. Thus, the calculation is to be performed without further dividing the sector into smaller sectors (270). Since three vertices belong to the administrative region 501 and one vertex belongs to the administrative region 502, the population of the sector 510 may be calculated as: area of sector 510*population density of administrative region 501*¾+area of sector 510*population density of administrative region 502*¼. In other words, the population of sector may be calculated through Equation 3.

$$f_{pop}(p) = \sum_{i}^{4_i} \rho_i \frac{A}{4} \quad \text{Equation 3}$$

In Equation 3, i represents a vertex number, $p_i$ represents a population density of the administrative region to which the vertex belongs, and A represents a width of the sector. The width of the sector may be calculated using an integral formula of the polar coordinate system.

In the case of the land fraction, the land fraction of the sector is obtained by searching for the administrative region to which the four vertices of the sector belong in the same manner as when the population is calculated, and adding all four values of 0.25 when the searched for administrative region exists and zero when the search administrative region does not exist. In this case, the weight value needs to be multiplied by the number of times of dividing the sector. In other words, the land fraction may be calculated through the following Equation 4.

$$f_{land}(p) = \frac{1}{4_{L-1}} \sum_{i}^{4_i} E_i \quad \text{Equation (4)}$$

In Equation 4, L is a depth of the sector, i.e., the number of divisions from the uppermost parent sector, and $E_i$ is the land fraction of the $i^{th}$ vertex. When the $i^{th}$ vertex is land, the $E_i$ value is 0.25, and when the $i^{th}$ vertex is sea, the $E_i$ value is zero.

The population and the land fraction thus calculated may be summed with the population and land fraction of the parent sector before being divided (280).

Figure 6:
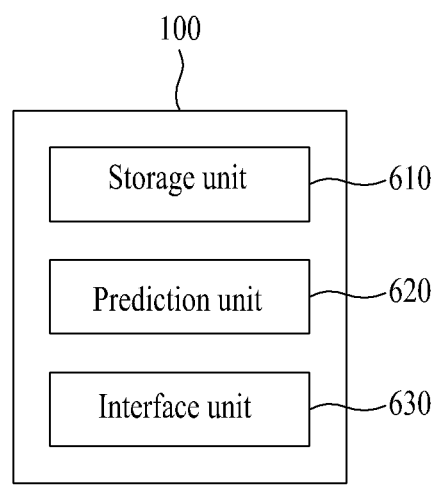
FIG. 6 is a block diagram for describing a configuration of a population estimation device according to an embodiment.

FIG. 6 is a block diagram for describing a configuration of a population estimation device according to an embodiment.

A population estimation device 100 may include a storage unit 610, a prediction unit 620, and an interface unit 630. These components may be representations of different functions performed by a processor according to control instructions provided by the program code stored in the population estimation device 100. In this case, the components may be implemented to execute instructions according to the code of an operating system and the code of at least one program included in a memory.

The processor may load the program code stored in a file of a program for the population estimation method into the memory. For example, when the program is executed in the population estimation device 100, the processor may control the population estimation device to load the program code from the file of the program into the memory under the control of the operating system.

The storage unit 610 may store location information of the nuclear power plant on a map. The storage unit 610 may store information of a plurality of single units associated with the nuclear power plant.

The prediction unit 620 may predict a multi-unit accident occurrence point based on information of the plurality of single units present in the nuclear power plant stored on the map. The prediction unit 620 may calculate the area of each administrative region using the administrative region data based on the GIS data and model a polar coordinate radiation grid composed of a plurality of sectors for performing safety evaluation of the nuclear power plant. The prediction unit 620 may calculate the sector data using a divide-and-conquer method based on the calculated area of each administrative region and the overlapping administrative region through the modeled sector in the modeled polar coordinate radiation grid. As the sector data is calculated, the prediction unit 620 may input an economic factor to the administrative region included in the sector and calculate a representative administrative region for each sector using the input economic factor. The prediction unit 620 may predict a multi-unit accident occurrence point based on a weight value for the plurality of single units present in the nuclear power plant. The prediction unit 620 may visually display a concentration and a radiation dose for each atmospheric nuclide on the map based on the sector data. For example, the prediction unit 620 may visually display the concentration and a human radiation dose for each atmospheric nuclide in the sector subjected to safety evaluation.

The interface unit 630 may provide a user interface (e.g., a tool) for population estimation to receive an input including location information of the nuclear power plant and information of a plurality of single units associated with the nuclear power plant. For example, the interface unit 630 may be provided in the form of a program or application to provide the user with the simplicity and convenience of pre-preparation operations required for population estimation. Information input through a user interface provided in the interface unit 630 may be stored in the storage unit 610. The interface unit 630 may implement a user-friendly interface using Google Map API with an engine displaying the map. The interface unit 630 may visually represent GIS format data (administrative region, sector, location, etc.) on the map through the user interface, and may be provided to verify the suitability of the GIS format data. In this case, the actual calculation may be performed in the program without using an API for speed and debugging convenience.

Mode for Invention

The device described above may be implemented as hardware components, software components, and/or a combination of hardware components and software components. For example, the device and components described in the embodiments may be implemented using one or more general purpose or special purpose computers, for example, a processor, a controller, an arithmetic logic unit (ALU), a digital signal processor, a microcomputer, a field programmable gate array (FPGA), a programmable logic unit ("PLU"), a microprocessor, or any other device capable of executing and responding to instructions. A processing unit may perform an operating system (OS) and one or more software applications running on the operating system. The processing unit may also access, store, manipulate, process, and generate data in response to execution of the software. For ease of understanding, the processing unit may be described as being used alone, but one of ordinary skill in the art will recognize that the processing unit may include multiple processing elements and/or multiple types of processing elements. For example, the processing unit may include a plurality of processors or a processor and a controller. Other processing configurations are also possible, such as parallel processors.

The software may include a computer program, code, instructions, or a combination of one or more thereof and may configure the processing unit to operate as desired or may instruct it independently or collectively. The software and/or data may be embodied in any type of machine, component, physical device, virtual equipment, computer storage medium, or device to be interpreted by or provide instructions or data to a processing unit. The software may be distributed over computer systems connected through a network and stored or executed in a distributed manner. The software and data may be stored on one or more computer-readable storage media.

The method according to the embodiment may be embodied in the form of program instructions which may be executed via various computer means and recorded on a computer-readable medium. The computer-readable medium may include program instructions, data files, data structures, etc., alone or in combination. The program instructions recorded on the medium may be those specially designed and configured for the embodiments or those known and usable by those skilled in the computer software field. Examples of the computer-readable recording medium include magnetic media such as a hard disk, a floppy disk, and a magnetic tape, optical media such a compact disc read-only memory (CD-ROM), a digital versatile disc (DVD), magneto-optical media like a floptical disk and hardware devices specifically configured to store and perform program instructions such as read-only memory (ROM), random-access memory (RAM), flash memory, and the like. Examples of program instructions include machine language code such as that produced by a compiler, as well as high-level language code that may be executed by a computer using an interpreter or the like.

Although the embodiments have been described above with reference to the limited embodiments and drawings, various modifications and variations by those skilled in the art are possible from the above description. For example, appropriate results may be achieved when the described techniques are performed in a different order than the described methods, and/or when components of the described systems, structures, devices, circuits, etc. are combined or combined in different forms from the described method, or replaced by or substituted with other components or equivalents.

Therefore, other implementations, other embodiments, and equivalents to the claims are within the scope of the following claims.

What is claimed is:

1. A population estimation method performed by a population estimation device, the method comprising:

storing location information of a plurality of nuclear power plants;

predicting a multi-unit accident occurrence point based on information on a plurality of single units respectively associated with the plurality of nuclear power plants, and displaying the multi-unit accident occurrence point on a first user interface of the population estimation device, the first user interface implemented using a map application programming interface (API) of an external map service interacting with the population estimation device, wherein predicting the multi-unit accident occurrence point comprises:

selecting a weight value for each of the plurality of nuclear power plants based on at least one of a power output of a respective nuclear power plant of the plurality of nuclear power plants, a discharge amount of a respective nuclear power plant of the plurality of nuclear power plants, and a population associated with a respective nuclear power plant of the plurality of nuclear power plants;

determining the multi-unit accident occurrence point based on the selected weight value for each of the plurality of nuclear power plants, calculating an area of each administrative region using administrative region data based on geographic information system (GIS) data; and modeling a radiation grid of a polar coordinate system composed of a plurality of sectors for performing safety evaluation of the plurality of nuclear power plants, wherein a grid of the polar coordinate system is modeled to automatically generate a set of sectors having coordinate values of the polar coordinate system based on setting information including a center point, an orientation, and an interval of the grid input through a second user interface for inputting the setting information by a user, wherein the method further comprises:

storing at least one point which is used as the setting information more than a predetermined number of times; and automatically designating the stored at least one point as the center point of the setting information, and wherein the displaying comprises:

acquiring analysis data for the sectors from an external system, the analysis data including concentration data and radiation dose data for each atmospheric halide;

converting the acquired analysis data into formatted data of a data model compatible with the population estimation device; and distinguishably and visually displaying, on the first user interface implemented using the map API, the concentration data and radiation dose data for each atmospheric halide based on the formatted data using different colors.

2. The method according to claim 1, wherein the predicting of the multi-unit accident occurrence point further comprises calculating sector data using a divide-and-conquer method based on the calculated area of each administrative region and an overlapping administrative region through a sector modeled in the modeled radiation grid of the polar coordinate system, and wherein the sector data comprises a population and a land fraction of a sector, an administrative region included in a sector, and a population and an area occupied by an administrative region included in a sector.

3. The method according to claim 2, wherein the predicting of the multi-unit accident occurrence point includes:
inputting an economic factor to an administrative region included in the sector as the sector data is calculated; and
calculating a representative administrative region for each sector using the input economic factor.

4. A non-transitory computer-readable recording medium storing a program which, when executed by at least one processor, causes the at least one processor to execute the method of claim 1.

5. A population estimation device comprising:
a storage unit that stores location information of a plurality of nuclear power plants;
a prediction unit that predicts a multi-unit accident occurrence point based on information on a plurality of single units respectively associated with the plurality of nuclear power plants; and
an interface unit that displays the multi-unit accident occurrence point on a first user interface of the population estimation device, the first user interface implemented using a map application programming interface (API) of an external map service interacting with the population estimation device,
wherein the prediction unit predicts the multi-unit accident occurrence point by:
selecting a weight value for each of the plurality of nuclear power plants based on at least one of a power output of a respective nuclear power plant of the plurality of nuclear power plants, a discharge amount of a respective nuclear power plant of the plurality of nuclear power plants, and a population associated with a respective nuclear power plant of the plurality of nuclear power plants; and
determining the multi-unit accident occurrence point based on the selected weight value for each of the plurality of nuclear power plants,
wherein the prediction unit:
calculates an area of each administrative region using administrative region data based on geographic information system (GIS) data; and
models a radiation grid of a polar coordinate system composed of a plurality of sectors for performing safety evaluation of the plurality of nuclear power plants,
wherein a grid of the polar coordinate system is modeled to automatically generate a set of sectors having coordinate values of the polar coordinate system based on setting information including a center point, an orientation, and an interval of the grid input through a second user interface for inputting the setting information by a user,
wherein the prediction unit:
stores, in the storage unit, at least one point which is used as the setting information more than a predetermined number of times; and
automatically designates the stored at least one point as the center point of the setting information, and
wherein the interface unit:
acquires analysis data for the sectors from an external system, the analysis data including concentration data and radiation dose data for each atmospheric halide;
converts the acquired analysis data into formatted data of data model compatible with the population estimation device; and
distinguishably and visually displays, on the first user interface implemented using the map API, the concentration data and radiation dose data for each atmospheric halide based on the formatted data using different colors.

6. The population estimation device of claim 5, wherein the interface unit provides a user interface for population estimation to receive an input including the location information on the plurality of nuclear power plants and information on the plurality of single units respectively associated with the plurality of nuclear power plants.

7. The population estimation device according to claim 6, wherein the prediction unit calculates sector data using a divide-and-conquer method based on the calculated area of each administrative region and an overlapping administrative region through a sector modeled in the modeled polar coordinate radiation grid, and
wherein the sector data comprises a population and a land fraction of a sector, an administrative region included in the sector, and a population and an area occupied by an administrative region included in a sector.

8. The population estimation device according to claim 7, wherein the prediction unit receives an economic factor to an administrative region included in the sector as the sector data is calculated, and the prediction unit calculates a representative administrative region for each sector using the input economic factor.

* * * * *